Figure 1:
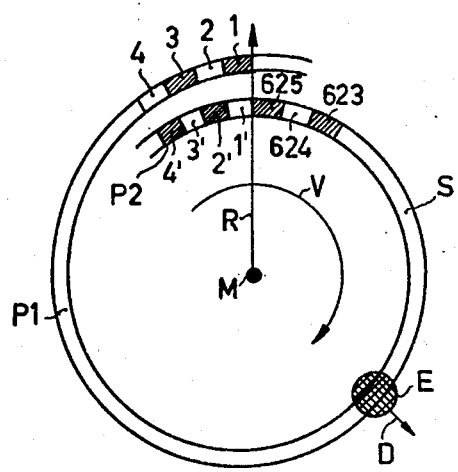

United States Patent [19]

Hoogendijk

[11] 4,057,827
[45] Nov. 8, 1977

[54] APPARATUS FOR READING COLOR TELEVISION SIGNAL FROM A DISC-SHAPED RECORD CARRIER

[75] Inventor: Adrianus Huibert Hoogendijk, Eindhoven, Netherlands

[73] Assignee: U.S. Philips Corporation, New York, N.Y.

[21] Appl. No.: 595,708

[22] Filed: July 14, 1975

[30] Foreign Application Priority Data

May 21, 1975 Netherlands .................. 7505938

[51] Int. Cl.² .............................................. H04N 5/76
[52] U.S. Cl. .................................................... 358/8
[58] Field of Search .................................... 358/8, 4

[56] References Cited

U.S. PATENT DOCUMENTS

| 3,564,123 | 2/1971 | Pezirtzoglov | 358/4 X |
| 3,679,814 | 7/1972 | Barclay | 358/8 |
| 3,717,725 | 2/1973 | Numakura | 358/4 |
| 3,798,357 | 3/1974 | Narahara | 358/4 |

Primary Examiner—John C. Martin
Assistant Examiner—Mitchell Saffian
Attorney, Agent, or Firm—Frank R. Trifari; Simon L. Cohen

[57] ABSTRACT

An apparatus for reading a disc-shaped record carrier, which apparatus comprises provisions such as a command device, for reproducing the recorded information in a scanning sequence which differs from that during recording. In order to maintain the line-sequential phase alternation of the color signal during reproduction via a PAL or SECAM receiver, a correction circuit has been provided. The correction circuit comprises a delay line for delaying the chrominance signal by one line period and a recombination circuit with a switch which is controlled by the command device. The recombination circuit, depending on the position of the switch, supplies an output signal which consists of the combination of the luminance signal and either the chrominance signal or the chrominance signal which has been delayed by one line period.

4 Claims, 5 Drawing Figures

APPARATUS FOR READING COLOR TELEVISION SIGNAL FROM A DISC-SHAPED RECORD CARRIER

The invention relates to an apparatus for reading a disc-shaped record carrier on which a color television signal is recorded in substantially parallel tracks, which apparatus is provided with a scanning unit for scanning the record carrier, a decoding device for converting the signal, which has been read with the aid of the scanning unit, into a standard color television signal, and a command device for controlling the scanning sequence of the information which is recorded on the record carrier.

Such an apparatus is described in U.S. Pat. No. 3,854,015. As scanning unit the apparatus described in said Patent employs an optical system, which with the aid of a beam of radiation reads the information which is recorded on the record carrier. When the record carrier is a magnetic disc, it is obvious that the information may also be read with the aid of magnetic heads, while there are also disc-shaped record carriers which can be read mechanically or capacitively.

A color television signal recorded on such a disc-shaped record carrier is generally not a standard color television signal, but is specially coded in order to be able to make optimum use of the limited bandwidth of said record carriers. As an example a coding system is mentioned on which the standard television signal as a whole is frequency-modulated on a carrier wave, and coding systems in which the luminance signal and chrominance signal are added to separate carrier waves in separate frequency bands. In order to allow the read apparatus to be directly connected to a standard reproducing apparatus, a decoding device is incorporated which converts the read-out signal into a standard colour television signal in accordance with the PAL, SECAM or NTSC standard.

As is described comprehensively in the above-mentioned patent, a disc-shaped record carrier is extremely suitable for realizing slow-motion, fast-motion, reverse motion or still pictures. In particular with optical read systems the scanning point on the record carrier, which point is determined by the scanning unit, can be moved freely over said disc without any damage. For example, in the case of a disc with a spiral track, a stationary picture can be realized by returning said scanning spot by one track pitch upon every revolution of the record carrier. However, in the case of a disc with a number of concentric tracks, a stationary picture is automatically obtained when one such track is continuously followed. This scanning sequence of the information which is recorded on the record carrier is controlled by a command device, whose operation has also been comprehensively described in the previously cited patent.

When realizing such changing reproduction speeds by scanning the information on the record carrier in a sequence other than that during recording a problem presents itself, if the ultimately obtained color signal is applied to a standard PAL or SECAM reproducing apparatus for which systems the invention is therefore especially of importance. As the problems which occur are basically the same for the two systems, only the problems associated with the PAL standard will be considered hereinafter for simplicity.

The standard PAL color television signal is characterized by a line-sequentially alternating phase of one of the color components of the chrominance signal. In order to enable a comparatively simple signal processing to be used during normal reproduction of the recorded program, the recorded color signal generally also exhibits said line-sequentially alternating phase. Inter alia in order to realize a stationary picture in the most favorable manner, it is useful to record one television image per full track-circumference; i.e. per revolution of the disc-shaped record carrier. Since for a standard PAL color television signal the number of lines of a television picture is 625, this means that the PAL phase of the color signal is the same for the first and the last line of a television picture.

However this means that when a stationary picture is realized the line-sequential alternation of the PAL phase is disturbed at the transition from a first reproduction of a recorded television picture to the next reproduction of the same recorded television picture. As a result the reproduction of the color signal in a standard PAL reproducing apparatus is disturbed. It will be evident that in the case of other deviating reproducing speeds the same problem occurs, when e.g. the same television picture is scanned twice in succession.

It is an object of the invention to provide a very simple and inexpensive solution to this problem. The apparatus according to the invention is therefore characterized in that the decoding device is provided with a correction circuit, which comprises an input terminal for receiving a color television signal derived from the read-out signal, a first filter for extracting the luminance signal contained in said color television signal, a second filter for extracting the chrominance signal contained in said color television signal, a delay means for delaying the extracted chrominance signal by one line period, and a recombination circuit with a summing means and a two-position switch which is controlled by the command device, which recombination circuit in a first position of the two-position switch is adapted to supply an output signal which is composed of the luminance signal and chrominance signal of the color television signal aplied to the input terminal, to an output terminal and in a second position of the two-position switch an output signal which is composed of the luminance signal and the chrominance signal of said color television signal applied to the input terminal, said chrominance signal being delayed by one line period.

Owing to the step according to the invention it is ensured that under all circumstances the line-sequential alternation of the PAL-phase in the chrominance signal at the output terminal can be maintained. When the same recorded television picture is scanned twice in succession setting the two-position switch to its second position during the second scan will ensure that during said second scan the read-out chrominance signal does not directly become available at the output terminal, but a chrominance signal which has been delayed by one line period. As said delayed chrominance signal then always has the opposite PAL-phase compared with that of the undelayed chrominance signal, the line-sequential alternation of the PAL-phase is thus maintained in a substantially correct manner.

It is true that during said second scan the reproduced luminance signal and chrominance signal no longer correctly match in respect of time, because the chrominance signal has been delayed by one line period. However, in the reproduced picture this generally has substantially no effect, because it will only play a part in the case of sharp horizontal transitions.

A first embodiment of the apparatus according to the invention is characterized in that the two-position switch has a first input which is coupled to the second filter, a second input which is coupled to the delay means, and a common output, while the summing means comprises a first input which is coupled to the first filter, a second input which is coupled to the output of the two-position switch, and an output which is coupled to the output terminal.

A second embodiment of the apparatus according to the invention is characterized in that the summing means comprises a first input which is coupled to the first filter a second input which is coupled to the delay means, and an output, while the two-position switch has a first input which is coupled to the input terminal, a second input which is coupled to the output of the summing means, and an output which is coupled to the output terminal. Said second embodiment is to be preferred in the case of systems in which the color television signal which is recorded on the record carrier consists of a composite signal which has been derived directly from a standard color television signal without separating the luminance and the chrominance signal. For such a coding of the color television signal on the record carrier care is to be taken that also during reproduction said color television signal is not interfered within so far as this is possible. In the case of the previously described second embodiment this requirement is met in that during normal reproduction, when the two-position switch occupies the first position, said composite signal is transferred unmodified and only in the case of deviating reproducing speeds a separation and recombination of the chrominance and luminance signal is effected.

Figure 2:
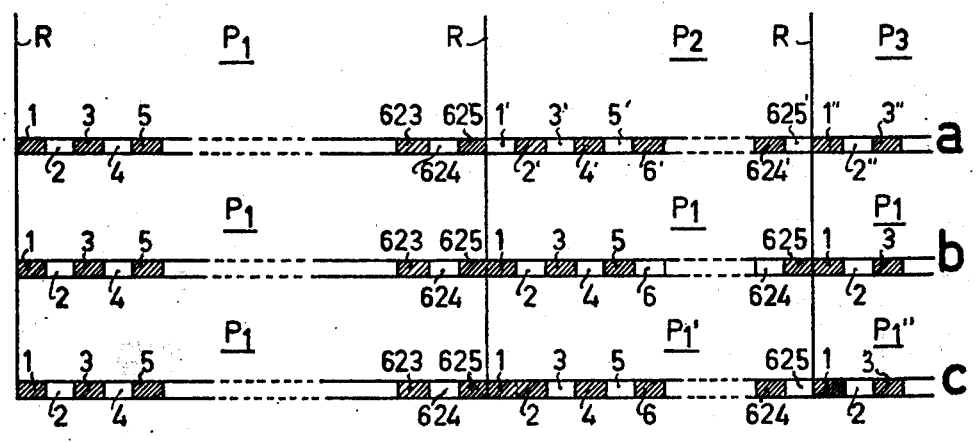

The invention will be described in more detail with reference to the drawing, in which FIG. 1 shows a part of a spiral track on a disc-shaped record carrier, and FIG. 2 shows the sequence of lines with the associated PAL-phase during scanning of such a track.

Figure 3:
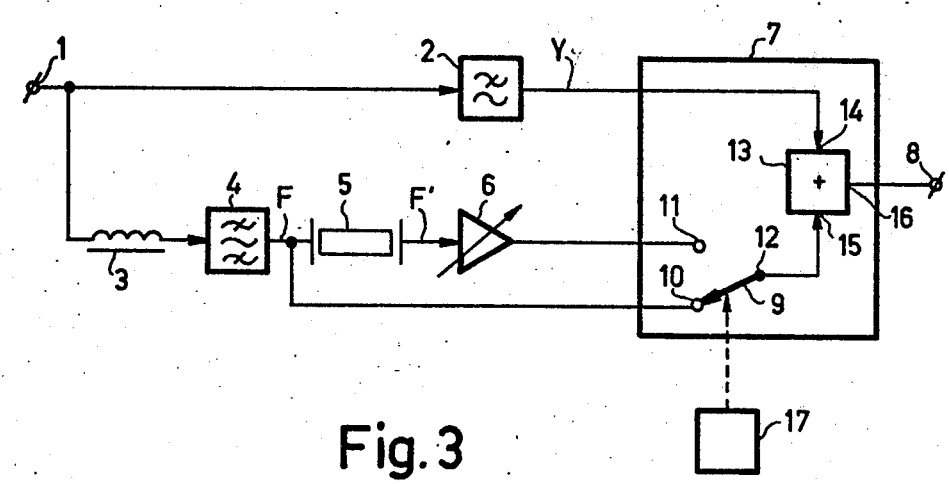
Figure 4:
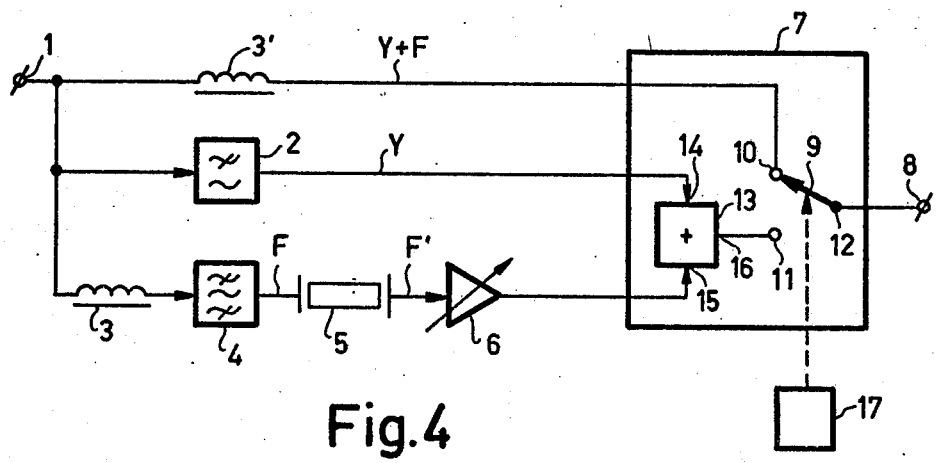
Figure 5:
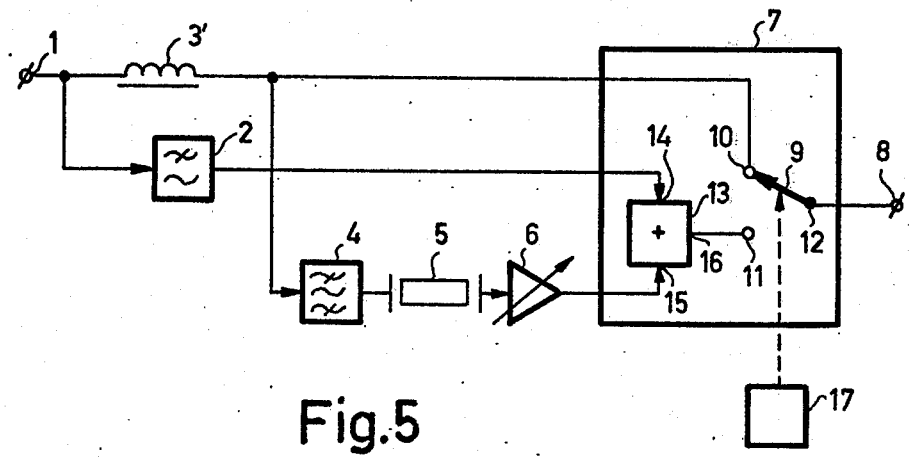

FIGS. 3, 4 and 5 show three embodiments of the correction circuit as employed in the read apparatus according to the invention.

FIG. 1 shows a spiral track S on a disc-shaped record carrier, which rotates about a center M with a direction of rotation v. Said track is scanned by means of a scanning unit, which ensures that the scanning spot E keeps in track. The entire read system and the servo systems required for this, have been described comprehensively in the cited U.S. Pat. No. 3,854,015 and are irrelevant for the principle of the invention, so that they will not be discussed any further.

It is assumed that per track circumference exactly one television picture is recorded, i.e. a picture $P_1$ starting with line 1 at the radial vector R and terminating with line 625 at the same radial vector R (European standard). This means that a stationary picture can be realized very simply by each time having the scanning spot E make a jump D as soon as the radial vector R coincides with said scanning spot E, so that always the same track circumference is scanned.

However, in respect of the chrominance signal this presents a problem, which will be further discussed with reference to FIGS. 2a and 2b. In these Figures the spiral track of FIG. 1 has, as it were, been unrolled. FIG. 2a shows the situation in which the scanning spot E continuously follows the spiral track, so that the recorded color television signal is reproduced at normal speed. Consequently the television pictures $P_1$, $P_2$, $P_3$ etc. are reproduced successively.

When considering the chrominance signal contained in the recorded color television signal, in the case that it is required to reproduce the read-out color television signal via a PAL reproducing apparatus, said chrominance signal will already exhibit the characteristics typical of the PAL standard. This means that the polarity of the color component (R-Y) will change every line, which is generally denoted by a line-alternating PAL phase. In FIG. 2a a line with positive PAL phase is shown shaded and it is assumed that line 1 of picture $P_1$ starts with said positive PAL phase. It is then obvious that line 625 of said picture $P_1$ will also have a positive PAL phase. Line 1 of the next recorded picture $P_2$, in contra-distinction to line 1 of picture $P_1$ has the negative PAL phase and line 1 of picture $P_3$ again the positive PAL phase. From the Figure it is evident that the line-sequential alternation of the PAL phase is maintained from picture to picture, which of course is essential for the reproducing apparatus, which responds to these phase alternations so as to reproduce the correct color picture.

FIG. 2b shows the situation in the case that a stationary picture is realized by each time scanning the same recorded picture $P_1$. The Figure clearly shows that said line-sequential PAL phase alternation is then disturbed for each picture change, because the reproduced odd lines of each picture then again have the positive PAL-phase. Thus, the phase of said line sequential PAL phase alternation changes as it were from picture to picture. A comparison with FIG. 2a reveals that during the second reproduction of picture $P_1$ (which corresponds to the reproduction of picture $P_2$ in FIG. 2a) the PAL-phase of corresponding lines is always opposed in these two cases.

In the reproducing apparatus said phase jumps at picture frequency in the PAL phase alternation results in that the electronic circuitry which respond to this PAL phase alternation, must lock in again to said changing PAL phase alternation after every picture change, which gives rise to the color in the reproduced picture being disturbed substantially.

In order to prevent this, the decoding device according to the invention, which converts the signal which has been read with the aid of the scanning unit into a standard color television signal, comprises a correction circuit of which a first embodiment is shown in FIG. 3.

This correction circuit comprises an input terminal 1, to which a color television signal is applied which has been derived from the signal read from the record carrier. This color signal applied to the input terminal 1 may have any arbitrary coding, depending on the coding of the signal recorded on the record carrier and the standard color television signal which is ultimately required. For simplicity it is assumed hereinafter that the color signal applied to the input terminal is a standard PAL color signal, but it is emphasised once more that any other composition of the applied color television signal is permissible.

From this standard PAL color television signal applied to the input terminal 1 the luminance signal Y is extracted with the aid of a low-pass filter 2, with for example 3-MHz bandwidth. With the aid of band-pass filter 4 the chrominance signal F is extracted, said filter 4 being preceded by a delaying element 3 in order to compensate for the delay caused by the low-pass filter 2. Said chrominance signal F is applied both to a first input 10 of a two-position switch 9 and to a delay means 5, which delays said chrominance signal by substantially one line period, i.e. approx. 64 μsecs. Said delay means 5 may simply comprise an ultrasonic glass delay line normally employed in PAL reproducing equipment. The delayed chrominance signal F' is applied to a second input 11 of the switch 9 via an adaptation amplifier 6, which compensates for the attenuation caused by the delay line and which also assures that the phase of the chrominance signal F' is correct.

Said switch 9 forms part of a recombination circuit 7, which furthermore includes a summing means 13, having a first input 14 to which the extracted luminance signal Y is applied and a second input 15, which is connected to the master contact of the switch 9. Said switch 9 is controlled by a command device 17, which also controls the scanning sequence of the information recorded on the record carrier. Finally, the output 16 of the summing means 13 constitutes the output terminal 8 of the correction circuit.

The operation of this correction circuit is as follows. The switch 9 is normally in the shown position. The summing means 13 then receives the luminance signal Y at its input 14 and the chrominance signal F at the input 15. Consequently, the color television signal originally applied to input terminal 1 will appear at the output terminal 8.

Assume that the picture $P_1$ recorded in track S has been scanned with the switch 9 in this position. The alternating PAL phase of the color television signal obtained at the output terminal 8 (see FIG. 2c) then fully corresponds to that shown in FIG. 2a (normal reproduction). If the recorded program is to be reproduced at the normal speed, it is obvious that the switch 9 remains in the shown position.

However, if for example a stationary picture is to be realized, the scanning spot E should perform a jump D upon every revolution of the record carrier (see FIG. 1). For this purpose a command signal should be supplied to the servo system which controls the radial position of said scanning spot E, which has been extensively descirbed in the cited U.S. Pat. No. 3,854,015. This command signal for the servo system is supplied by the command device 17, waich by the detection of the vertical pulses of the read-out color television signal ensures that the command pulse for the servo system appears during the vertical fly-back period.

However, this command device 17 now simultaneously with the command pulse for the servo system also supplies a control pulse for the switch 9, so that said switch changes over and input 10 is connected to master contact 12. This means that for the second picture period $P_1'$ during which the recorded picture $P_1$ is being read for the second time, the combination of the luminance signal Y and the chrominance signal F' which has been delayed by one line period becomes available at the output 8 of the correction circuit as a color television signal. Owing to this delay by one line period of the chrominance signal a shift by one line period of the pattern of the PAL phase alternations is achieved. It is evident from FIG. 2c that the change of the PALS phase which is now obtained in the picture $P_1'$ is in synchronism with that which appears during normal reproduction (FIG. 2a).

The only deviation which persists concerns the first line of this reproduced picture $P_1'$ which has the same PAL phase as line 625, so that upon the picture change from $P_1$ to $P_1'$ three successive lines 625, 1 and 2 will have the same PAL phase. However, this is of no importance because these 3 line periods appear during the picture change, the vertical flyback period, so that this disturbance is not visible. Moreover, no information about the PAL phase is available in the color television signal for a number of lines during this flyback period (no color burst), so that this brief disturbance of the rhythm of the PAL phase alternation does not present any problem.

On the next command and control pulse from the command device circuit 17 at the beginning of the third scan of the picture $P_1$ switch 9 is reset to the shown position. FIG. 2c shows that picture $P_1''$ is then again fully identical to picture $P_1$ and also has the correct PAL phase immediately after the transition.

The step according to the invention thus ensures when a stationary picture is realized the rhythm of the PAL phase alternation, apart from a perfectly permissible brief disturbance during the picture change, is not affected. During the second reproduction ($P_1'$) of the recorded picture $P_1$ the time relationship between the luminance signal and the chrominance signal is no longer entirely correct, because the chrominance signal has been delayed by one line period. However, generally this does not result in a serious visible disturbance in the reproduced picture, because this shift of the chrominance signal can only play a part in the case of sharp horizontal transitions in the color.

What has been described hereinbefore for realized a stationary picture is equally valid for realized any other deviating reproducing speed. When each time that the command device applies a command pulse to the servo system, for performing a radial jump of the scanning spot by one track pitch or an odd number of track pitches, the switch 9 also receives a control pulse, so that its position is changed, the rhythm of the PAL phase alternation in the color television signal at the output terminal 8 is automatically maintained correct.

In order to ensure that during normal reproduction of the color television signal which is recorded on the record carrier the time relationship of the luminance and the chrominance signal is correct, it is very effective to design the switch 9 so that it has a preferred position, in which the input 10 is coupled to the master contact 12. This ensured that after termination of a period with deviating reproducing speed said switch automatically assumes said preferred position, irrespective of the position occupied at the end of said period. Depending on the reproducing speeds which are to be realized, this automatic reset to the preferred position is to be performed with a specific time constant. When realizing a stationary picture, it is of course possible to ensure in a simple manner that automatic change-over to the normal reproducing speed is not effected until said two-position switch has assumed a first position.

FIG. 4 shows a second embodiment of the correction circuit, in which corresponding elements are denoted by the same reference numerals as in FIG. 3. The input terminal 1 is directly coupled via a delaying element 3' to the input 10 of the switch 9 of the recombination circuit 7. Furthermore this input terminal 1 is connected to the low-pass filter 2, so that the luminance signal Y is extracted, and via a delaying element 3 to the band-pass filter 4, so that the chrominance signal F is extracted. Said chrominance signal F is delayed by one line period by the delay means 5 and via the adaptation amplifier 6 it is applied to the input 15 of the summing means 13, whose input 14 is coupled to the low-pass filter 2. The output 16 of the summing means 13 is connected to the input 11 of the switch 9, the master contact 12 of said switch being connected to the output terminal 8 of the correction circuit 7.

The figure clearly shows that in the shown position of the switch 9 the color television signal at the input terminal 1 is applied directly, i.e. without any processing, to the output terminal 8. When the switch 9 assumes the other position, the color television signal at the output terminal 8 is composed of the luminance signal Y and the chrominance signal Y, which has been delayed by one line period, fully in accordance with what has been described with reference to FIG. 3.

This embodiment of FIG. 4 is of special interest for record carriers in which the recorded color television signal has been coded in such a manner that a standard color television signal can be derived from it without separation of the luminance and the chrominance signal. In this respect composite systems are considered first of all, in which a complete standard color television signal is frequency-modulated on an FM carrier wave and is recorded on the record carrier. The complete standard color television signal can be recovered during reading by frequency demodulation. As normally, the color television signal applied to terminal 1 becomes directly available at the output terminal 8 via the switch 9, optimum use is made of said composite signal during normal reproduction in the embodiment shown in FIG. 4. The separation and recombination of the two signal components is then effected only in the case of reproduction at deviating reproducing speeds.

FIG. 5 finally shows a modification of the embodiment of FIG. 4. Now the band-pass filter 4 is not connected to the input terminal 1 via a delaying element 3 but is coupled to the delaying element 3' in the circuit between the input terminal 1 and input 10 of the switch 9. The two delaying elements 3 and 3' in FIG. 4 both serve to compensate for the delay of the low-pass filter 2, so that in fact one common delaying element suffices. Moreover, the adaptation amplifier 6, which essentially serves to compensate for losses caused by the delay means, can be made simply adjustable both in respect of gain and phase, so that possible minor differences between various circuits can be corrected.

Furthermore, it is to be noted that the band-pass filter 4 may essentially form part of the delay means 5. The glass delay line generally used for this delay means already exhibits a band-pass characteristic, which can be adapted to the requirements in respect of the pass-band for said color television circuit, so that no separate band-pass filter is needed. The filters which are used may take the form of comb filters. Finally, it is to be noted that the switch 9 preferably takes the form of a generally known electronic switch.

I claim:

1. An apparatus for reading a disc-shaped record carrier on which a color television signal is recorded in adjacent tracks, of the type provided with a scanning unit for scanning the record carrier, a decoding device for converting the signal read from the record carrier with the aid of the scanning unit into a standard PAL type color television signal, and a command device for selectively repeating the scanning of predetermined frames of the television signal recorded on the record carrier, the improvement wherein the decoding device is provided with a correction circuit, which comprises an input terminal for receiving a color television signal derived from the read-out signal, a first filter connected to said input terminal for extracting the luminance signal contained in said color television signal, a second filter connected to said input terminal for extracting the chrominance signal contained in said color television signal, a delay means connected to said second filter for delaying the extracted chrominance signal by one line period, a signal controlled recombination circuit means connected to said first filter and to said delay means and controlled by the command device for selectively providing at an output terminal an output signal composed of the luminance signal and the chrominance signal of the color television signal applied to the input terminal and in response to the repetition of a predetermined frame providing an output signal composed of the luminance signal applied to the input terminal and the chrominance signal extracted from the color television signal applied to said input terminal and delayed by one line period.

2. An apparatus as claimed in claim 1, wherein the recombination circuit means comprises a two-position switch having a first input coupled to the second filter, a second input coupled to the delay means, and a common output, said recombination circuit further comprising a summing means having a first input coupled to the first filter, a second input coupled to the output of the two-position switch, and an output which is coupled to the output terminal.

3. An apparatus as claimed in claim 1, wherein said recombination circuit comprises a summing means having a first input coupled to the first filter, a second input coupled to the delay means, and an output, said recombination circuit further comprising a two-position switch having a first input which is coupled to the output of the summing means, and an output which is coupled to the terminal.

4. An apparatus as claimed in claim 3, wherein the connection between the input terminal and the first input of the two-position switch includes a time delay element, and the second filter coupled to the output of said element.

* * * * *

UNITED STATES PATENT AND TRADEMARK OFFICE
CERTIFICATE OF CORRECTION

PATENT NO. : 4,057,827

DATED : November 8, 1977

INVENTOR(S) : ADRIANUS HUIBERT HOOGENDIJK

It is certified that error appears in the above-identified patent and that said Letters Patent are hereby corrected as shown below:

<u>IN THE TITLE</u>

After "READING" should be --A--;

Col. 5, line 42, "descirbed" should be --described--;

line 44, "waich" should be --which--;

Col. 6, line 29, "realized" should be --realizing--;

line 30, "realized" should be --realizing--;

Claim 3, line 6, after "the" should be --input terminal, a second input which is coupled to the--;

Signed and Sealed this

Twenty-third Day of May 1978

[SEAL]

Attest:

RUTH C. MASON
Attesting Officer

LUTRELLE F. PARKER
Acting Commissioner of Patents and Trademarks